July 27, 1943.  A. LAUER ET AL  2,325,522

APPARATUS FOR CONTRACTING THE ENDS OF HOLLOW BODIES

Filed July 29, 1940  2 Sheets-Sheet 1

Inventors
AMROSIUS LAUER
WILLY LAUER
John B. Brady
Attorney

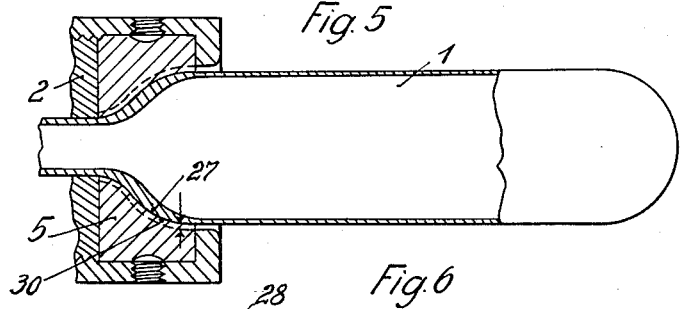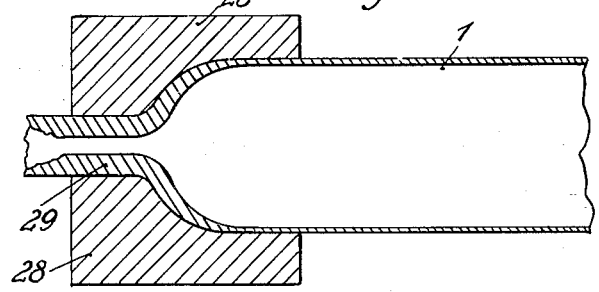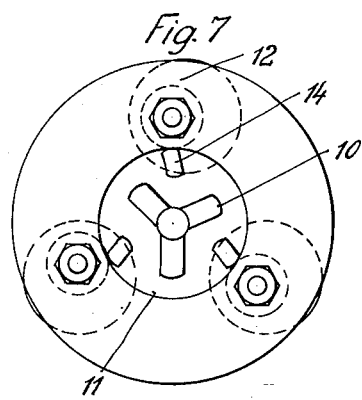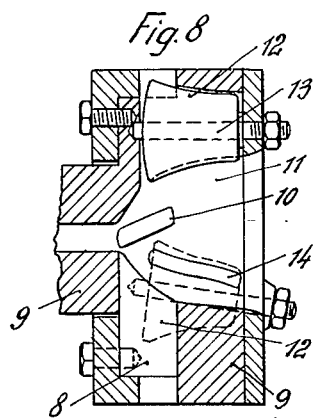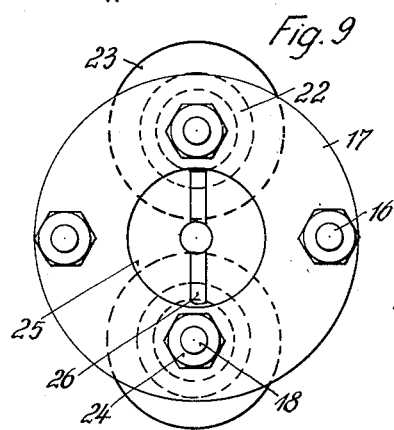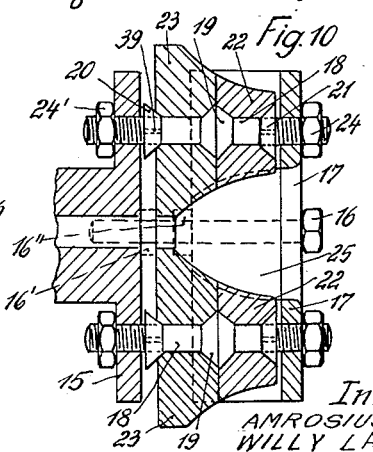

Patented July 27, 1943

2,325,522

UNITED STATES PATENT OFFICE 2,325,522

APPARATUS FOR CONTRACTING THE ENDS
OF HOLLOW BODIES

Ambrosius Lauer, Posen, and Willy Lauer, Karlsruhe, Germany; vested in the Alien Property Custodian Application July 29, 1940, Serial No. 348,274
In Germany August 14, 1939

4 Claims. (Cl. 78—89)

This invention relates to a method of contracting or inwardly turning the open ends of hollow bodies and to an apparatus for carrying out this method.

It is an important object of the present invention to provide steps and means for contracting the open ends of hollow bodies in such a manner that the wall thickness is at least partly increased.

A special object of the invention is to make the neck and bottom portions of steel and light metal bottles having thin walls and to produce a relatively considerable concentration of material at the neck or shoulder portions of the bottles.

With these and further objects in view, as may become apparent from the within disclosures, the invention consists not only in the structures herein pointed out and illustrated by the drawings, but includes further structures coming within the scope of what hereinafter may be claimed.

The character of the invention, however, may be best understood by reference to certain of its structural forms, as illustrated by the accompanying drawings in which:

Fig. 5 is an axial section, showing a tool in accordance with the invention, operating on a steel bottle.

Fig. 6 shows an axial section of a steel bottle as it is subsequently being swaged in a die.

Fig. 7 is a front view of a modified tool having the invention applied thereto.

Fig. 8 is an axial section of the tool shown in Fig. 7.

Fig. 9 is a front view of another modification.

Fig. 10 is an axial section of the tool shown in Fig. 9.

Similar characters of reference denote similar parts in the different figures.

As here shown, the walls of the hollow bodies are contracted and thickened by means of a tool head which is rotated with respect to the work piece, and held in frictional engagement with the work piece by means of suitably shaped portions or members on the tool head.

Normally, thin walled steel plates, in order to turn them inwards without folds and cracks have to be heated repeatedly or operated upon with heated tools or oxygen apparatus, so as to avoid premature cooling of the thin walls. In my novel process, on the other hand, the work piece is merely heated to a temperature sufficient to render it more plastic, e. g., to red heat and then operated upon by the rotary friction tool which is forced against the work piece with such a pressure and relative speed that the temperature of the work piece is not only maintained but even increased to white heat or welding temperature.

According to a further important feature of the invention, additional tools or tool portions in rolling engagement with the work piece may be provided to operate on the work piece.

In the practice of our invention, the work piece, for example, a steel bottle, is heated to 900° C. to 1000° C. at its end to be contracted, and forced under pressure into the tool head rotating at high speed. The walls of the work piece are thus reinforced or thickened at the desired points by the action of the friction tools or by the combined action of the friction and roller tools, respectively. It will be appreciated that the tool may be rotating while the work piece remains stationary, or vice versa.

By our novel process, the manual labour so far required for turning inwards thin-walled steel and light metal bottles may be dispensed with, whereby up to 90 percent wages can be saved. Our novel device permits the thickening to be placed at any portion of the neck. The friction tool is most effective in concentrating material at certain points or portions. Therefore, in order to produce a strong thickening at the neck portion, the front tools on the tool head are roller tools while the tools to the rear thereof are friction tools. On the other hand, where a greater wall thickness is required at the shoulder portion of the steel bottle, the front tools are made to be rigid, while the tools to the rear of the tool head are made to be rolling, in the manner which will be explained below. It has been found that the reinforcement or thickening of the wall obtainable by rigid tools acting by sliding friction is 40 to 50 percent in excess of that obtainable by rolling. This phenomenon is probably due to the fact that the friction established between the tool and the work piece prevents the material from flowing readily forward as in rolling operations, so that a greater concentration of material is produced at the point of the frictional engagement.

Figure 1:
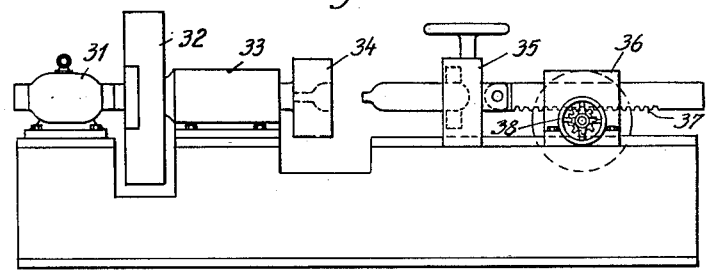
Fig. 1 is a side elevation of an arrangement for carrying out the invention.

Referring now to the drawings in greater detail, and first to Fig. 1, it will be seen that on a machine frame 40 similar to that of a lathe there are mounted in co-axial relationship a motor 31, a fly wheel disc 32, a bearing bracket 33 and a tool head 34 which is rotated by the motor. Co-axially opposed to said tool head is a work piece 1 clamped in a clamping device or chuck 35 which is slidably mounted on the bed of machine frame 40 and may be moved to the left by a rack and pinion drive 36, 37 operated by a hand wheel 38, for forcing the work piece 1 into the head 34.

Figure 2:
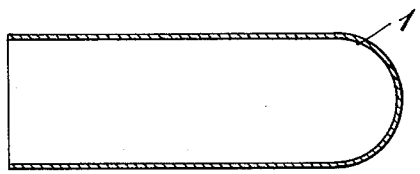
Fig. 2 is a sectional view of a work piece to which my novel process may be applied.

The work piece may be in the form indicated in Fig. 1, or it may take the form shown in Fig. 2, with a plain cylindrical left hand end which is to be turned in.

Figure 3:
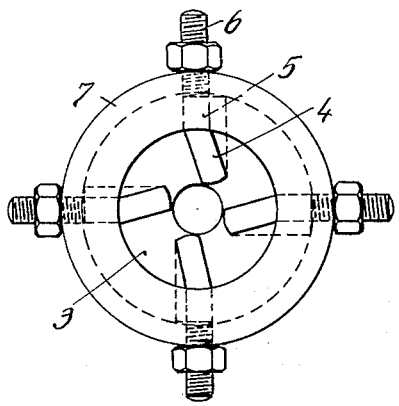
Fig. 3 is a front view of a tool for use in accordance with the invention.
Figure 4:
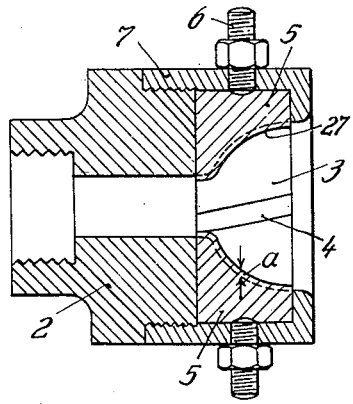
Fig. 4 is an axial section through the tool of Fig. 1.

One form of a tool head for use in the arrangement of Fig. 1 is shown in Figs. 3 to 5, comprising a guide member 3 for the bottle neck, including slots 4 for the friction bodies which in this case take the form of segments 5 seated in slots 4 and projecting therefrom by a certain distance. Set screws 6 in the sleeve 7 which is threaded on a support body 2 permit radial adjustment of the segments 5 as to their amount of projection $a$ from the inner walls of the guide member 3. It will be clear that the work piece 1 thus engages only the active front faces 27 of the segments 5 without coming into contact with the inner surface of the member 3 proper. As best seen in Fig. 3, the segments 5 are arranged not strictly radially, but at an acute angle relative to the radial direction. Their active surfaces 27 may consist of hard metal.

Referring now to Figs. 7 and 8, segment-shaped friction bodies 8 are mounted to project through slots 10 of a guide member 11 in a tool head 9. Moreover, slant rollers 12 are mounted for rotation on shafts 13 on the front part of the tool head so as to project slightly through slots 14 in the front portion of the guide member 11.

A preferred embodiment of a tool head for combined frictional and rolling action is illustrated in Figs. 9 and 10. A front plate 17 together with a centrally recessed guide member 25 is secured to a flanged support 15 by means of screws or studs 16 which are screwed into the flange 15 and locked by locking nuts 16'. Further locking nuts 16" serve to hold the plate 17, together with a guide member 25 for the work piece, in a fixed position on the studs 16. Mounted between the flange of support 15 and plate 17 are pairs of conical rollers 22, 23, on screw bolts 18 which are formed with central double cone portions 19, while further conical members 20 and 21 are slidably mounted on the bolts 18 and prevented from rotation thereon by grooves and keys, as indicated at 39. The rollers 22, 23 are mounted to project through slots 26 in the guide member 25 into the trough-shaped central recess thereof which conforms to the final contours of the work piece.

The device shown in Figs. 9 and 10 permits alternative adjustment to lock either or both of the pairs of rollers 22, 23 against rotation, for action as friction tools. For instance, in order to lock the rollers 22, the nuts 24 on bolts 18 are operated to jam rollers 22 between the conical portions 19 of the bolts and the cones 21, or plate 17, respectively. Of course, the screws 16 with their lock nuts 16' and 16" must be re-adjusted accordingly to permit this jamming action and to lock the parts in position. On the other hand, if it is intended to lock the rollers 23, these rollers are jammed between the conical portions 19 on bolts 18 and the cones 20, by operation of the nuts 24' and corresponding readjustment of the screws 16 and nuts 16' and 16". Again, by screwing down both pairs of nuts 24 and 24' and corresponding readjustment of screws 16 and nuts 16' and 16" it is possible to jam both pairs of rollers 22 and 23. In this way it is possible to adapt this tool to carry out various different working operations, involving the use of loose rollers only, or of loose front and fixed rear rollers, or of fixed front and rear rollers, thus meeting a wide scope of different demands in working operations of the type referred to.

As shown in Fig. 6, the thickened portions at the shoulders 30 of the work piece, obtained for instance by rubbing or friction tools of the type shown in Fig. 5, may be shifted to the neck portion 29 of the work piece, by forging or hammering the work piece between pairs of dies 28.

The method and apparatus of the present invention have been described in detail with reference to specific embodiments. It is to be understood, however, that the invention is not limited by such specific reference but is broader in scope and capable of other embodiments than those specifically described and illustrated in the drawings.

We claim:

1. A tool for contracting and reinforcing the open ends of metal work pieces, comprising two pairs of rollers each pair being coaxially mounted on a common shaft, said rollers being engageable with the work piece, and means for selectively locking either or both of said pairs of rollers against rotation, for establishing rubbing engagement of the locked pair of rollers with the work piece.

2. A tool for contracting and reinforcing the open end of a metal work piece comprising pairs of substantially conical shaped rollers, means for journalling each pair of rollers coaxially on shafts spacially mounted to allow the entry of the metal work piece intermediate the pairs of rollers, and means for selectively locking said pairs of rollers against rotation for establishing rubbing engagement of the locked pair of rollers with the work piece.

3. A tool for contracting and reinforcing the open ends of metal work pieces comprising shaft members disposed in spaced relation for receiving the open end of a metal work piece therebetween, said shaft members each including a central double cone portion thereon, pairs of substantially conical shaped rollers carried by said shaft members in abutment with each other and against said central double cone portions of said shaft members, and end members carried by said shaft members and engageable with opposite end faces of the rollers constituting each pair of conical rollers for controlling the operation of said rollers with respect to the metal work piece introduced intermediate said rollers.

4. A tool for contracting and reinforcing the open ends of metal work pieces comprising supporting shaft members disposed at spaced intervals for the introduction of the open end of a metal work piece therebetween, each supporting shaft member having a central double cone portion and a keyway adjacent opposite ends thereof, a pair of coaxially disposed substantially conical shaped rollers carried by each of said shaft members with adjacent faces of said rollers abutting the central double cone portions of the supporting shaft members, additional conical members slidably mounted on the keyways of the supporting shaft members and engageable with the opposite faces of said conical rollers, and means for selectively locking certain of said pairs of rollers against rotation for establishing rubbing engagement of the locked pair of rollers with the work piece.

AMBROSIUS LAUER.
WILLY LAUER.